United States Patent [19]
Whitehead

[11] Patent Number: 4,559,657
[45] Date of Patent: Dec. 24, 1985

[54] SHEET METAL BEDRAIL

[75] Inventor: Larry W. Whitehead, Lexington, N.C.

[73] Assignee: Leggett & Platt, Incorporated, Carthage, Mo.

[21] Appl. No.: 649,819

[22] Filed: Sep. 12, 1984

[51] Int. Cl.⁴ ............................................. A47C 19/02
[52] U.S. Cl. ........................................ 5/286; 5/288; 403/10; 403/347; 403/382
[58] Field of Search ............... 5/282 R, 286, 287, 288, 5/293, 298, 299, 300, 304; 403/382, 347, 381, 375, 10; 312/330 SM

[56] References Cited

U.S. PATENT DOCUMENTS

| 28,276 | 5/1960 | Hubbard | 5/300 |
| 608,545 | 8/1898 | Coburn | 5/286 |
| 2,947,999 | 8/1960 | Hooker | 5/286 |
| 3,210,780 | 10/1965 | Hooker | 5/286 |
| 3,901,572 | 8/1975 | Litchfield | 312/330 |

Primary Examiner—Alexander Grosz
Attorney, Agent, or Firm—Wood, Herron & Evans

[57] ABSTRACT

A sheet metal bedrail for mounting within a cutout portion formed in the legs of the headboard of a bed. The bedrail is formed of thin gauge sheet metal having a longitudinally and vertically extending central web portion and longitudinally extending beads at the upper and lower marginal edges of the web. A plastic end cap having a pair of spaced legs mounted perpendicularly to a plate is adapted to engage the bedrail so that the legs extend within the spaced beads. Aligning mounting bores are formed in the beads of the bedrail and legs of the end cap which receive bolts adapted to mount the bedrail within the cutout portion of the headboard legs.

3 Claims, 3 Drawing Figures

SHEET METAL BEDRAIL

BACKGROUND OF THE INVENTION

This invention relates to bedrail assemblies, and, more particularly, to a sheet metal bedrail and its connection to the headboard of a bed.

Bed frames for supporting a mattress and box springs generally include a pair of spaced siderails which are connected at one end by a crossrail and at the other end to the headboard of the bed. The crossrail and siderails of most bed frames are formed of relatively heavy steel plate in the shape of an angle iron. These prior art bed frames provide good support for the mattress and box springs but are relatively heavy and can be difficult to move with the added weight of the mattress and box springs when the bed is assembled.

Bed frames having lightweight, sheet metal bedrails have been proposed, such as shown, for example, in U.S. Pat. Nos. 3,210,780 and 2,947,999. In these designs, the bedrails are formed from a thin gauge section of sheet metal having a longitudinally and vertically extending center web section with rectangular shaped beads extending longitudinally along its edges. A steel plate formed with outwardly extending hooks is adapted to mount at one end of the bedrail where it is secured to the center web portion and the beads by spot welding. The hooks extend beyond the web and beads, and are adapted to mount over pins embedded within a slot formed in the front side of each leg in a standard headboard.

The sheet metal bedrails described above are considerably lighter than the angle irons used in other bed frame constructions, but have sufficient compressive strength to withstand downward loads applied by the weight of the mattress and box springs, and persons using the bed. However, the hook elements which mount the bedrail to the headboard in the '780 and '999 patents increase fabrication costs and do not permit mounting of the bedrail to the exterior or outer side of the legs of the headboard. As disclosed in such patents, the hook elements are connected to a plate which mounts to the bedrail. The plate is first forced between the web portion and a flange formed on each bead of the bedrail, and are then spot welded to the web portion and beads. The separate assembly and welding steps needed to mount the hook elements in place add to the fabrication costs of the bedrail. In addition, the hook elements are conventionally adapted to mount over pins embedded in a slot formed in the front side of each headboard leg. Therefore, the bedrail designs such as shown in U.S. Pat. Nos. 2,947,999 and 3,210,780 are not adapted to mount to the exterior side of headboard legs, but only to the front side of the legs of the headboard.

SUMMARY OF THE INVENTION

It is therefore among the principal objects of this invention to provide a sheet metal bedrail which is economical to manufacture, which requires minimal assembly operations, and which is adapted to mount to the exterior side of the legs of standard headboards.

The bedrail which accomplishes these objectives comprises a section of thin gauge sheet metal including a longitudinally and vertically extending central web portion having top and bottom edges. The web portion is formed with a longitudinally extending, rectangular shaped bead at its top and bottom edges, and each bead is formed with a mounting bore near one end of the web portion. An end cap, formed of rigid plastic, is adapted for insertion into the beads at one end of the bedrail to provide sufficient rigidity for mounting of the bedrail to the headboard and also to cap the end of the bedrail. The end cap includes a pair of spaced legs connected at opposite ends of a plate and extending perpendicularly thereto. Each leg is formed with a mounting bore. The legs are adapted to be inserted within the beads of the headrail so that the mounting bores in the legs align with the mounting bores in the beads.

The outer side of each leg of the headboard is formed with a cutout portion having a pair of mounting bores. To connect the bedrail to the headboard, the bedrail is placed within the cutout portion so that its mounting bores align with the mounting bores in the cutout. A bolt is then inserted through the mounting bores and secured by a nut. Preferably, the bedrail is sized to fit flush within the cutout portion of the headboard leg along both its outer and back sides.

DESCRIPTION OF THE DRAWINGS

The structure, operation and advantages of this invention will become further apparent upon consideration of the following description taken in conjunction with the accompanying drawings, wherein.

DETAILED DESCRIPTION OF THE INVENTION

Figure 1:
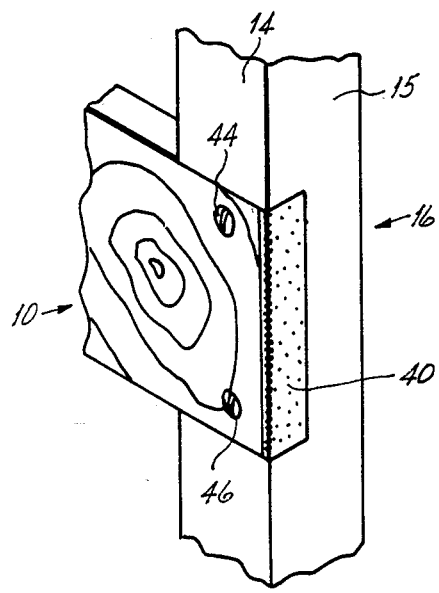
FIG. 1 is a partial perspective view of the bedrail of this invention secured to the leg of a standard headboard.

The bedrail 10 of this invention forms part of a bed frame adapted to support a mattress and box springs (not shown). The bedrail 10 is adapted to mount within a cutout portion 12 having spaced mounting bores 13, which is formed in the outer side 14 of the leg 16 of a standard headboard. Only a portion of one headboard leg 16 is illustrated in the drawings, it being understood that a second bedrail 10 is adapted to mount to the other leg of the headboard in the same manner as described below.

Figure 3:
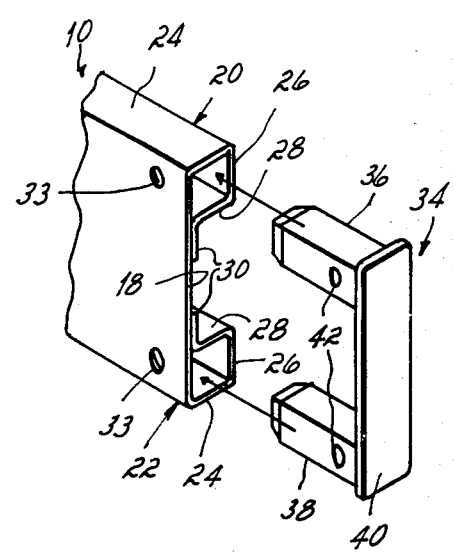
FIG. 3 is an exploded perspective view of an end of the bedrail herein prior to insertion of the end cap.

Referring now to FIG. 3, the bedrail 10 is of one piece construction consisting of a thin gauge sheet metal sheet having a longitudinally and vertically extending flat web portion 18 formed with a longitudinally extending bead 20 at its upper edge and a longitudinally extending bead 22 at its lower edge. Each bead 20, 22 is formed by folding a marginal portion of the edges of web 18 perpendicular to itself forming a horizontal flange 24. The horizontal flange 24 is folded at a right angle forming a vertical flange 26 parallel to the web portion 18. The vertical flange 26 is then folded perpendicularly to itself, and the web portion 18, forming an inner flange 28 parallel to the horizontal flange 24. The inner flange 28 is then folded perpendicularly to itself forming a terminal flange 30 lying in side-by-side relation and parallel to the face of the web 18. The upper and lower beads 20, 22 are thus hollow, generally rectangular shaped members which are separated by the web portion 18 and extend longitudinally along the entire length of bedrail 10. As shown in FIG. 3, both the upper and lower beads 20, 22 are formed with a mounting bore 33, adjacent the end of bedrail 10.

The beads 20, 22 at the end of bedrail 10 are adapted to receive an end cap 34, preferably formed of rigid molded plastic such as polyethylene. End cap 34 includes a pair of spaced legs 36, 38 which are mounted on opposite ends of a plate 40 and extend perpendicularly thereto. A mounting bore 42 extends through each leg 36, 38. In preparation for mounting bedrail 10 to the headboard leg 16, the legs 36, 38 of end cap 34 are inserted within the beads 20, 22 so that the mounting bores 42 of the legs 36, 38 align with the mounting bores 33 of the beads 20, 22. Preferably, the mounting bores of the legs and beads are positioned so that the plate 40 engages the bedrail 10 with the end cap 34 in position within the bedrail 10. The end cap 34 is readily inserted within beads 20, 22 by hand, and no welding, gluing or other means are needed to secure the end cap 34 in place. This simplifies assembly of bedrail 10 and reduces fabrication costs.

Figure 2:
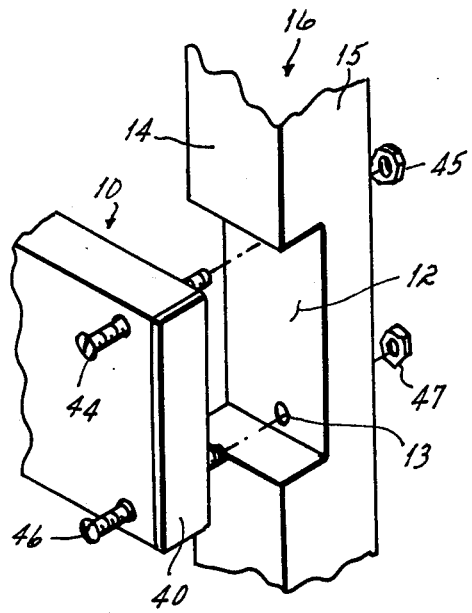
FIG. 2 is a partial exploded view of the bedrail just prior to its connection with the headboard leg.

Referring to FIG. 2, the bedrail 10 is mounted to the headboard leg 16 by a pair of bolts 44, 46 secured by nuts 45, 47. The bedrail 10 is first slid within the cutout portion 12 of the headboard leg 16. The bedrail 10 is positioned so that the mounting bores 33 of the beads 20, 22 and the mounting bores 42 of the legs 36, 38 align with the through bores 13 formed in the cutout portion 12 of the headboard leg 16. In the aligned position, the plate 40 of the end cap 34 is flush with the back side 15 of the headboard leg 16. The bolts 44, 46 are then inserted through the bores 33, 42, 13 and tightened in place by the nuts 45, 47, as shown in FIG. 1. Preferably, the width of the beads 20, 22 is equal to the depth of the cutout portion 12 so that the bedrail 10 is flush with the outer side 14 of the headboard leg 16.

The end cap 34 performs two important functions in the mounting of bedrail 10 to the headboard leg 16. In order to make the bedrail 10 lightweight, thin gauge sheet metal is used to form the bedrail 10. Placement of the rigid plastic end cap 34 into the end of bedrail 10, enables the bolts 44, 46 to be securely tightened against the headboard leg 16. Without the support provided by the end cap 34, the hollow upper and lower beads 20, 22 would collapse upon tightening of the bolts 44, 46. In addition, the plate 40 of the end cap 34 covers the beads 20, 22 at the end of bed rail 10 to provide a finished, attractive appearance to the bedrail 10.

It can be observed from FIG. 1 that a relatively large area of bedrail 10 engages the cutout portion 12 in headboard leg 16. The bedrail 10 is confined within the cutout portion 12 along the horizontal and vertical flanges 24, 26 of the beads 20, 22. This large area of contact between the bedrail 10 and headboard leg 16 provides a secure connection therebetween and the bedrail 10 easily accommodates vertical loading applied by the weight of the mattress, box springs and persons using the bed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of this invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sheet metal bedrail assembly adapted to mount within a cutout portion formed in the legs of the headboard of a bed comprising:

a sheet metal bedrail adapted for insertion within said cutout portion formed in said legs of said headboard, said legs having mounting bores formed in said cutout portion, said bedrail including a longitudinally and vertically extending web portion having top and bottom marginal edges, said web portion being formed with longitudinally extending beads at each of said top and bottom edges, said top and bottom beads each being formed with a mounting bore;

an end cap having a pair of spaced legs mounted to opposite ends of a plate and extending perpendicularly thereto, each of said legs being formed with a mounting bore;

said legs of said end cap being adapted to be inserted within said upper and lower beads of said bedrail so that said mounting bores formed in said legs align with said mounting bores formed in said beads, said plate of said end cap engaging and covering one end of said bedrail;

a bolt insertable through said mounting bores of each of said beads of said bedrail and said legs of said end cap with said bedrail in position within said cutout portion of said legs of said headboard, said bolts extending through said mounting bores in said cutout portion and being tightened therewithin for mounting said bedrail to said headboard.

2. The bedrail assembly of claim 1 in which said end cap is a one piece molded plastic element, said end cap being adapted to provide support for said beads upon tightening of said bolts and to cover the end of said bedrail.

3. The bedrail assembly of claim 1 in which said beads each have a width dimension perpendicular to said web portion, said plate of said end cap having a width dimension, and said cutout portion being formed at a given depth within said headrail, said width of said beads and said width of said plate being substantially equal so that said plate extends flush with said beads, the width of said beads and the width of said plate being substantially equal to the depth of said cutout portion so that said bedrail extends flush with said headboard upon insertion of said bedrail within said cutout portion of said headboard.

* * * * *